March 24, 1959  C. DEY ET AL  2,879,461
SPEED REGULATING MOTOR CONTROL SYSTEM
Filed April 15, 1954
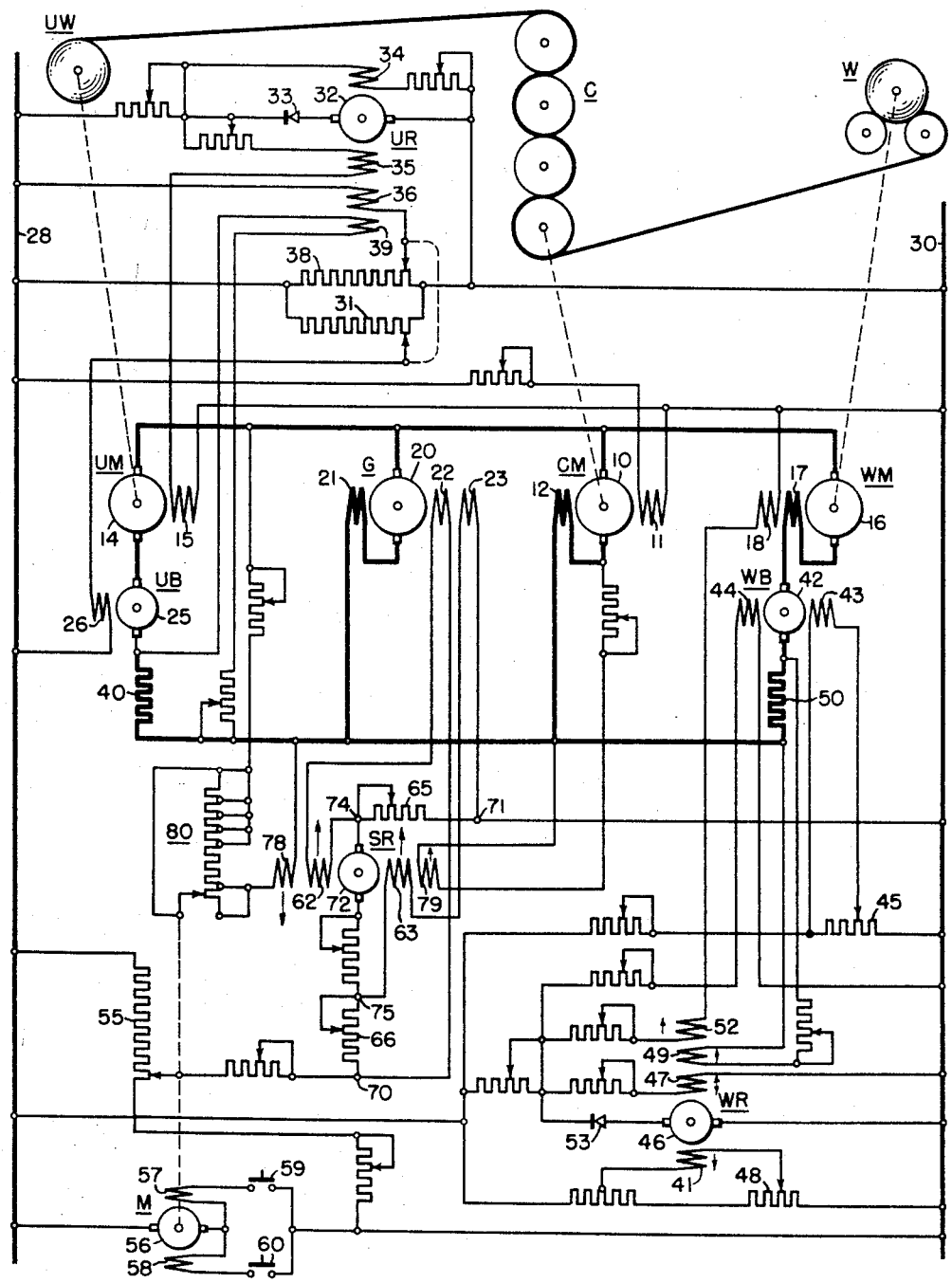
WITNESSES
Robert C. Baird
F. V. Giolma
INVENTORS
Chester Dey &
Walter H. Mathews.
BY
Paul E. Friedemann
ATTORNEY _United States Patent Office_ 2,879,461
Patented Mar. 24, 1959

2,879,461

SPEED REGULATING MOTOR CONTROL SYSTEM

Chester Dey, Buffalo, and Walter H. Mathews, Kenmore, N.Y., assignors to Westinghouse Electric Corporation, East Pittsburgh, Pa., a corporation of Pennsylvania Application April 15, 1954, Serial No. 423,395

12 Claims. (Cl. 318—143)

Our invention relates to motor control systems and has reference in particular to speed regulating systems for motors, such as in supercalender drives and the like.

Generally stated, it is an object of our invention to provide for extending the operating range of a speed regulator in a motor control system.

More specifically, it is an object of our invention to provide for extending the operating range of a speed regulating generator without unduly increasing the pattern field ampere turns.

Another object of our invention is to provide for limiting the effective control ampere turns in a speed regulator in response to an increase of a reference quantity.

Yet, another object of our invention is to provide for extending the operating range of a speed regulator in a supercalender drive by reducing the effective value of a speed control quantity applied to the regulator during a non-productive portion of the operating range of the regulator.

It is also an object of our invention to provide in a regulator having excitation control windings energized in accordance with the armature voltage and current of a motor for matching a variable reference pattern winding to insert resistance in circuit with the voltage winding during the lower operating portion of the pattern winding range.

Other objects will, in part, be obvious and will, in part, be explained hereinafter.

In one embodiment of our invention, the operating range of a speed regulating generator for controlling the speed of a supercalender drive is extended without a corresponding increase in the pattern field ampere turns by progressively inserting resistance in the circuit of a voltage field winding of the regulating generator during a non-productive portion of the speed range above the threading speed and below the normal operating speed, thereby requiring fewer pattern field ampere turns to balance the voltage field ampere turns at a given speed in the normal operating range.

For a more complete understanding of the nature and scope of our invention, reference may be made to the following detailed description which may be read in connection with the accompanying drawings, in which the single figure is a schematic diagram of a supercalender drive embodying the invention in one of its forms.

Referring to the drawing, a supercalender drive is shown wherein a plurality of calender rolls C are driven by a calender motor CM having an armature 10, a shunt field winding 11 and a regulating field winding 12. Paper is supplied to the calender rolls C from an unwind reel UW connected in driving relation with an unwind motor UM having an armature 14 and a shunt field winding 15. From the calender rolls the paper proceeds to a winding reel W driven by a winder motor WM having an armature 16, series field winding 17 and a shunt field winding 18.

Electrical energy is supplied to the armatures of the three motors from a main generator G having an armature 20 connected in parallel circuit relation with the motor armatures, a series field winding 21 and a pair of shunt field windings 22 and 23.

An unwind booster generator UB having an armature 25 and a shunt field winding 26 is connected in series with the armature 14 of the motor UM. The field winding 26 is connected to excitation bus conductors 28 and 30 through a tension control rheostat 31. The tension of the strip between the unwind reel and the calender rolls is regulated by an unwind regulating generator UR which is provided for varying the excitation of the shunt field winding 15 which is connected to the excitation bus conductors 28 and 30. The armature 32 of the regulating generator UR is connected across the shunt field winding 15 in series with a rectifier device 33 so as to provide for varying the excitation of the field winding 15 above a minimum excitation value derived from the conductors 28 and 30. The regulating generator UR has an antihunt field winding 34 connected in shunt with the armature 32, a self-energizing field winding 35 connected in series with the shunt field winding 15, a pattern field winding 36 which is connected to the excitation bus conductors 28 and 30, through a tension control rheostat 38 and a differential current field winding 39 which is connected across a resistor 40 in series with the armature 14 of the unwind motor UM. The rheostats 31 and 38 are mechanically coupled so as to control the output of the booster generator UB in accordance with the tension for which the regulating generator UR is to operate.

A winder booster generator WB having an armature 42 and main and auxiliary shunt field windings 43 and 44 is connected in series with the armature 16 of the winder motor for compensating for the IR drop thereof. The main field winding 43 is connected to the excitation bus conductors 28 and 30 through a rheostat 45, while the auxiliary field winding 44 is connected across the armature 46 of a winder tension regulator generator WR which is connected in shunt with the field winding 18 of the winder motor to vary its excitation from the conductors 28 and 30. The regulating generator WR has an antihunt field winding 47 connected across its armature, a differential pattern field winding 41 connected to the conductors 28 and 30 through a tension control rheostat 48, a cumulative current control field winding 49 connected across a resistor 50 in series with the winder motor armature 16 and a self-energizing field winding 52 connected in series with the field winding 18 of the winder motor. A rectifier device 53 is connected in circuit with the armature 46 to render the regulating generator effective to vary the excitation of the field winding 18 above a minimum value only.

In order to provide for controlling the speed of the calender drive, the shunt field windings 22 and 23 of the main generator G are connected to the excitation bus conductors 28 and 30 through a motor-operated rheostat 55 having a motor M for operating the rheostat to raise and lower the output voltage of the generator. In this instance, the motor M comprises an armature 56 having field windings 57 and 58 disposed to be oppositely energized through "raise" and "lower" push-button switches 59 and 60 for operating the motor in opposite directions to raise and lower the generator voltage. The field windings 22 and 23 are connected in the opposite legs of a Wheatstone bridge in series with the pattern field windings 62 and 63 of a transducer in the form of a regulator such as a speed regulating generator SR. Resistors 65 and 66 comprise the other legs of the bridge circuit which is connected at points 70 and 71 to the conductors 28 and 30 through the motor-operated rheostat 55. The armature 72 of the speed regulating generator SR is connected between terminal points 74 and 75 of the bridge circuit so as to provide for varying the excitation of the pattern and shunt field windings without affecting the voltage from the excitation conductors. The regulating generator SR has a differential voltage winding 78 which is connected across the armature of the generator G and a current field winding 79 which is connected across the series field winding 12 of the calender motor so as to provide a net control field which is responsive to the speed of the calender motor.

In order to provide for obtaining a wide operating range for the speed regulating generator SR without requiring a pattern field of a prohibited strength since the ratio of threading speed to maximum productive speed of the calender motor is 1:90, a rheostat 80 is connected in series relation with the voltage field winding 78 of the regulating generator. This rheostat is operatively connected to the motor-operated rheostat 55 so as to insert resistance into the circuit of the voltage field winding, as the motor-operated rheostat is operated to increase output voltage of the generator G and the strength of the pattern field windings 62 and 63. In order to maintain an exact proportionality between the calender motor counterelectromotive force and the net value of the voltage and current fields during the productive speed range which is from about 900 to 1800 feet per minute, the top 50% of the rheostat 80 is shorted out so that all of the change in resistance in this circuit occurs below the normal productive speed range. Since it is desirable to maintain as close a relation as possible between the counterelectromotive force and the net value of the voltage and current fields during the threading speed range, the lower 10% of the rheostat 80 is likewise shorted out.

In normal operation, the "raise" push-button switch 59 will be closed to effect operation of the rheostat motor M to operate the rheostat 55 to cut out resistance from the circuit of the generator field windings. This varies the voltage across the bridge circuit in one direction without causing a drop across the terminals connected to the regulating generator armature 72. The net excitation of the voltage field winding 78 and the current field winding 79 is continuously balanced against excitation of the pattern field windings 62 and 63, any differential therebetween producing a voltage across the armature 72 in a direction to eliminate such differential so that the regulating generator at all times maintains the proper speed relation of the calender motor CM for any given position of the motor-operated rheostat 55.

For any given speed, the unwind regulating generator UR controls the energization of the field winding 15 of the unwind motor UM to maintain a predetermined tension in the paper between the unwind reel and the calender rolls. If the tension increases, the excitation of the differential current winding 39 increases, and this reduces the output voltage of the regulating generator UR. The excitation of the field winding 15 is thereby reduced, and the motor UM speeds up, thereby restoring the tension to the desired value. The winder regulating generator WR operates in a somewhat similar manner thereof in an opposite sense since the current field winding 49 is cumulative, and an increase of tension in the paper between the calender drive and the winder reel W results in an increase in the output voltage of the regulating generator. This increases the excitation of the winder motor field winding 18 causing the motor to slow down and reduce tension.

During the lower portion of the speed range at the threading speed, for example of about 20 feet per minute, the rheostat 80 is ineffective to vary the relationship between the excitation effect of the voltage winding 78 of the speed regulating generator and the actual voltage of the generator G. As the rheostat 55 is operated from above the threading speed range to approximately 900 feet per minute, resistance is progressively inserted in series with the voltage field winding 78 to reduce the effective ampere turns required in the pattern field windings 62 and 63 to balance the effect of the voltage field windings for any given speed. Thus, the regulating generator SR can regulate for a much wider speed range without having to increase the excitation of the pattern field windings 62 and 63 to an excessive value. This resistance is inserted during a non-productive portion of the speed range so that it has little or no ill effect on the operation of the drive. When the rheostat 55 reaches the normal operating range of the drive which is, in this instance, from 900 to 1800 feet per minute, the upper portion of the rheostat 80 is shorted out and is not effective to further alter the relationship between the counterelectromotive force of the calender motor and the net ampere turns of the voltage and current field windings. Thus, during the operating range, direct proportionality is maintained between these values which results in the most satisfactory operation.

From the above description and the accompanying drawing, it will be apparent that we have provided in a simple and effective manner for extending the operating range of a speed regulator in a motor control system without requiring anywhere near the ratio of change in pattern field ampere turns as the ratio of operating speeds obtained. The objects of our invention may be attained without materially altering existing equipment, thereby greatly extending the operating range thereof at little or no expense.

Since certain changes may be made in the above-described construction and different embodiments of the invention may be made without departing from the spirit and scope thereof, it is intended that all the matter contained in the above description and shown in the accompanying drawing shall be considered as illustrative and not in a limiting sense.

We claim as our invention:

1. In combination, a transducer having a plurality of input circuits for controlling an output circuit, adjustable impedance means connecting one of the input circuits to a source of energization for varying the energization thereof over a predetermined operating range, and additional adjustable impedance means for connecting another of said input circuits to a control source in opposition to said one input circuit, the adjusting means of both impedance means being operatively connected to vary the additional impedance means in the opposite sense to that of the adjustable impedance means.

2. In combination, a transducer having a plurality of input circuits for controlling an output circuit, adjustable impedance means connected in circuit with one of the input circuits to provide a pattern circuit having its energization adjustable over a predetermined operating range, and an additional adjustable impedance means connecting another of the input circuits to a control source in opposition to said one input circuit, the adjusting means of said impedance means being so connected as to adjust the additional impedance means in an opposite sense to that of said adjustable impedance means, and during only a portion of the operating range thereof.

3. In combination, a transducer having a plurality of input circuits for controlling an output circuit, an adjustable impedance device for connecting one of said input circuits to a source of excitation, an additional impedance device for connecting another of said input circuits to a control source to oppose said one input circuit, and means so connecting said impedance devices as to adjust said additional impedance device in the opposite sense to that of the adjustable impedance device and during an intermediate portion of the operating range thereof only.

4. A regulator comprising a magnetic circuit having coupled excitation windings including a pattern winding and an opposed control winding, adjustable means for varying energization of the pattern winding over a predetermined range, and control means operable to vary energization of the control winding, said control means being operatively connected to the adjustable means for varying energization of the control winding during only a portion of the operating range of the adjustable means.

5. In a regulating system, a regulator having a plurality of inductively coupled excitation windings including pattern and control windings, impedance means connected in circuit with the pattern winding having means for adjusting the impedance thereof, and adjustable impedance means connected in circuit with the control winding, said adjustable impedance means being actuated by the aforesaid adjusting means for varying the adjustable impedance means in the opposite sense to that of said impedance means.

6. In a regulating system for a motor having an armature and a field winding, a generator having an armature connected to supply electrical energy to the motor armature and having a field winding, a regulator having an output circuit for controlling the energization of the generator field winding and having a plurality of input circuits for controlling the output circuit, an adjustable impedance means for adjusting the energization of one of the input circuits to provide a pattern circuit, additional adjustable impedance means connecting another of the input circuits to be energized in accordance with the armature voltage of the motor in opposition to said one input circuit, and means operatively connecting the adjustable impedance means to effect operation thereof in opposite senses.

7. In a control system for a motor having an armature and a field winding, circuit means connecting the field winding, to a source of excitation, a generator having an armature connected to supply electrical energy to the motor armature and having a field winding, a regulator having an output circuit and a plurality of input circuits for controlling said output circuit, circuit means connecting said generator field winding and one of the input circuits in a bridge circuit, additional circuit means connecting the output circuit across said bridge circuit, adjustable impedance means connecting said bridge circuit to a source of excitation, and an additional adjustable impedance means connecting another of the input circuits to be energized in accordance with the motor armature voltage in opposition to said one input circuit, the adjusting means of both adjustable impedance means being connected so that the additional adjustable impedance is adjusted in the opposite sense during a predetermined portion of the operating range of the impedance means.

8. A drive comprising, a motor having a field winding connected to a source of excitation and having an armature, a generator having an armature connected to supply electrical energy to the motor armature and having a field winding with two sections, a regulating generator having an armature and a plurality of excitation windings, circuit means connecting a pair of said excitation windings one in each of opposite legs of a Wheatstone bridge with one section of the generator field winding, a circuit connecting the regulating generator armature between diametrically opposite points of said bridge circuit, adjustable impedance means connecting the bridge circuit to a source of excitation, additional adjustable impedance means connecting another of the excitation windings to be energized in opposition to said pair of excitation windings in accordance with the voltage of the motor armature, additional circuit means connecting yet another of said excitation windings cumulatively with respect to said pair in accordance with the motor armature current, and means operatively connecting the adjustable impedance means and the additional adjustable impedance means to vary the latter in an opposite sense to the former during only an intermediate portion of the operating range of the former.

9. In combination with a motor having an armature and a field winding connected to a source of excitation, a generator having an armature connected to supply electrical energy to the motor armature and having a field winding, a rheostat connecting the generator field winding to a source of excitation, regulating means connected in circuit relation with the generator field winding for maintaining a predetermined operating condition of the motor, and means for recalibrating the regulating means in response to operation of the generator field rheostat.

10. In a control system for a motor having an armature and a field winding connected to a source of excitation, a generator having an armature connected in circuit relation with the motor armature and having a field winding, means connecting the generator field winding to a source of excitation including an adjustable rheostat, regulating means having a plurality of excitation circuits for controlling the excitation of the generator field winding including one excitation circuit energized in accordance with the motor armature voltage, and adjustable resistance means connected in circuit with said one excitation circuit for recalibrating the regulating means in response to operation of the rheostat through a limited portion of its operating range.

11. In a control system for a motor, a generator for supplying electrical energy to the motor, adjustable means for varying excitation of the generator over a relatively wide operating range, regulating means for controlling said excitation to maintain a predetermined speed of the motor for a given operating position of said adjustable means, and adjustable impedance means for recalibrating the regulating means in response to operation of the adjustable impedance means in a predetermined portion of its operating range only.

12. In a control system for a motor, a main generator for supplying electrical energy to the motor, excitation means for said generator, means including a motor-operated rheostat for adjusting the excitation of said excitation means over a range from a minimum to a maximum value, regulating means for maintaining a predetermined speed condition of said motor for a particular adjustment of said rheostat, and adjustable impedance means for recalibrating the regulating means in response to operation of the rheostat in an intermediate portion of its operating range only.

References Cited in the file of this patent

UNITED STATES PATENTS

| | | |
|---|---|---|
| 2,508,172 | King et al. | May 16, 1950 |
| 2,583,074 | Allbert et al. | Jan. 22, 1952 |
| 2,684,458 | Winchester | July 20, 1954 |